United States Patent [19]
Bohannon

[11] Patent Number: 5,512,967
[45] Date of Patent: Apr. 30, 1996

[54] PROJECTOR

[75] Inventor: William K. Bohannon, San Diego, Calif.

[73] Assignee: Proxima Corporation, San Diego, Calif.

[21] Appl. No.: 128,548

[22] Filed: Sep. 28, 1993

[51] Int. Cl.[6] ................................................. G03B 21/00
[52] U.S. Cl. .................................. 353/31; 353/34; 353/20
[58] Field of Search ................................. 353/20, 31, 34, 353/37, 94; 348/744, 745, 750, 751, 752, 757, 758, 790, 794

[56] References Cited

U.S. PATENT DOCUMENTS 4,864,390  9/1989  McKechnie et al. ..................... 353/34
5,115,305  5/1992  Baur et al. ............................... 348/751
5,200,843  4/1993  Karasawa et al. ........................ 353/20
5,237,435  8/1993  Kurematsu et al. ...................... 348/751
5,283,599  2/1994  Tejima et al. ............................. 353/37

FOREIGN PATENT DOCUMENTS 3-192320  8/1991  Japan ....................................... 353/34

*Primary Examiner*—William C. Dowling
*Attorney, Agent, or Firm*—Bernard L. Kleinke; Jerry R. Potts; Peter P. Scott

[57] ABSTRACT

Light pre-polarized in a particular plane is divided into a plurality of paths, where each path includes a reflecting mirror, a dichroic mirror and a liquid crystal display. The light in each display is selectively modulated and combined for projection purposes. The displays are rubbed in directions coordinate with the display peripheries to enhance the contrast of the light passing through the display.

69 Claims, 6 Drawing Sheets

PROJECTOR

This invention relates to projectors and more particularly to projectors which provide an enhanced image in comparison to projectors of the prior art.

In recent years, considerable advances have been made in projecting color images on a screen. For example, light from a source has been divided by mirrors, dichroic mirrors and liquid crystal display panels into a plurality of different paths each passing light in an individual range of wavelengths representing an individual color. Specifically, a first path includes a first mirror, a first dichroic mirror and a first liquid crystal display panel to pass a range of wavelengths providing a red color; a second path includes a second mirror, a second dichroic mirror and a second liquid crystal display panel to pass a range of wavelengths providing a green color a third path includes a third mirror, a third dichroic mirror and a third liquid crystal display panel to pass a range of wavelengths providing a blue color. The light passing through the liquid crystal displays may be combined in a projection lens to produce light for projection on a screen. The projection lens magnifies and projects the image on the screen.

In the projection systems of the prior art, signals may be selectively applied at each instant to individual ones of the liquid crystal display panels to block the passage of light through such individual ones of the display panels. Depending on the individual ones of the liquid crystal display panels receiving the signals at each instant, light of an individual color or a combination of individual colors may be provided at the projection lens. In this way, an individual image may be magnified and projected on the screen.

U.S. Pat. No. 4,864,390 issued on Sep. 5, 1989, discloses and claims a "Display System with Equal Path Lengths". In this system, the paths for the different colors are provided with equal lengths from the light source to the projection lens and from the light source to the liquid crystal display panel in each individual path. This system is advantageous in that the equal path lengths for the different colors tend to reduce the distortion of the image projected on the screen.

Although the system disclosed in U.S. Pat. No. 4,864,390 has certain advantages, it also has a number of disadvantages. For example, it is not compact. It does not provide the image on the screen with a sufficient intensity. It emphasizes certain colors in relation to other colors and thus distorts the color of the image. Furthermore, the construction of the liquid crystal display panels tends to block the passage of certain colors through such panels and thus distorts the image projected on the screen.

The disadvantages discussed in the previous paragraph are not individual to the system disclosed in U.S. Pat. No. 4,864,390. They also exist in other systems employing liquid crystal display panels. The disadvantages have been known in the art to exist for some time. A considerable effort has been made by persons skilled in the art to overcome these disadvantages. In spite of these efforts, such disadvantages still exist.

This invention provides projection systems which overcome the disadvantages discussed above. The system of this invention provides a compact arrangement with minimal distortions of an image. It projects the image on the screen with a high intensity so that the image can be clearly seen even when the room providing for the display of the image is relatively bright. It compensates for any distortions in the intensity of different colors initially separated from an incoming light and thereafter combined for projection on a screen.

In one embodiment of the invention, light may be pre-polarized light in a particular (e.g. S) plane. The pre-polarized light may be divided into a plurality of paths each providing an individual range of wavelengths. Each path includes a reflecting mirror, a dichroic mirror and a liquid crystal display. The light in each display may be selectively modulated to provide for a controlled passage of light in accordance with such modulation. The light from the different displays may be combined after the selective modulations and the combined light may be projected on a screen.

To shorten the path lengths, the members in individual paths (but not in at least one other path) may be rotated (preferably less than 10°) from the positions providing equal path lengths from the source to the position of combination. Pairs of the displays may be disposed in abutting and transverse relationship with the borders overlapping so that only the display apertures receive light.

The pre-polarized light may be divided into two (2) portions, one processed as discussed above and the other processed independently. The light in particular wavebands (e.g. blue) may be combined with the modulated light from the first portion to compensate for differences in intensity. Alternatively, the light from the two (2) portions may be modulated individually to provide separate images.

When two (2) light sources overlap, lenses may condense and integrate the light before pre-polarization. The displays may be unrubbed or rubbed in directions coordinate with the display peripheries to enhance the contrast of the light passing through the displays.

Figure 1:
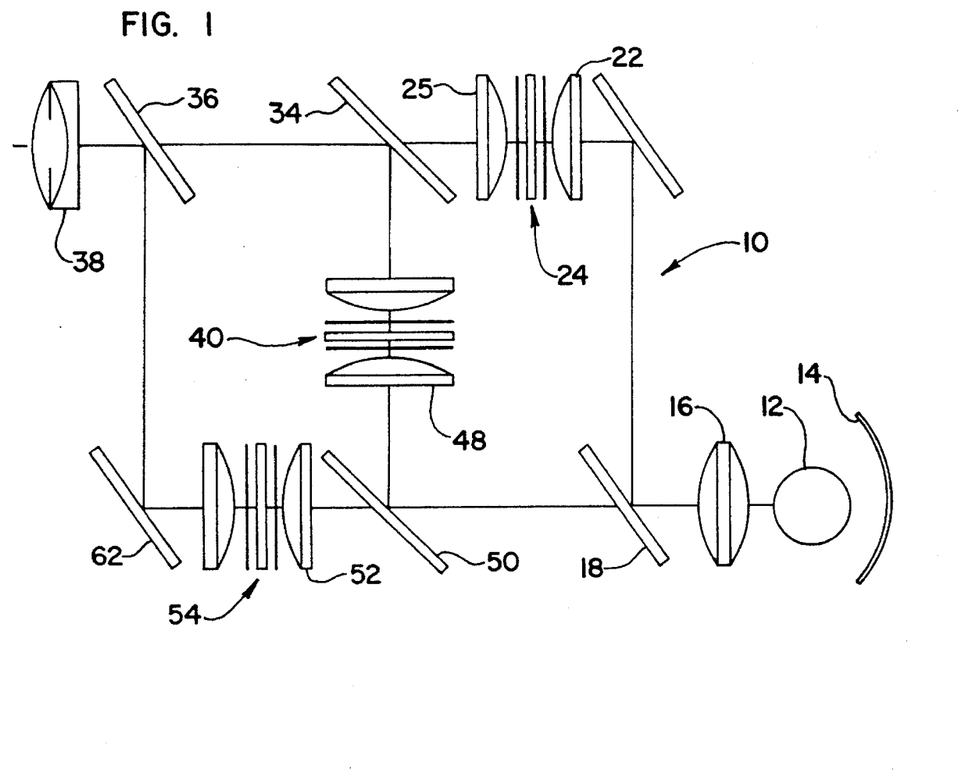
FIG. 1 is a schematic view of optical apparatus providing one embodiment of the invention.

In one embodiment of this invention, a system generally indicated at 10 is schematically shown in FIG. 1 for projecting an image on a video screen. The system includes a light source 12 which provides light to a reflector 14, preferably parabolic. The reflector 14 focuses the light and directs the focussed light to a pre-polarizer 16. The pre-polarizer 16 may be constructed in a conventional manner to polarize the light in a particular plane. Preferably the polarized plane is an S-plane for reasons which will be discussed in detail subsequently. In the embodiment shown in FIG. 1, the pre-polarizer 16 is preferably disposed perpendicular to the direction of the light from the reflector 14 so that substantially all of the light will pass through the pre-polarizer.

The light passing through the pre-polarizer 16 travels to a dichroic mirror or filter 18. Mirrors such as the dichroic mirror 18 are well known in the art. The mirror 18 is constructed to reflect light in a particular range of wavelengths and to pass the light in the other ranges of wavelengths. For example, the dichroic mirror 18 is constructed to reflect light in the range of wavelengths providing a blue color and to pass light in the other ranges of wavelengths. These constitute the red and green colors.

Figure 2:
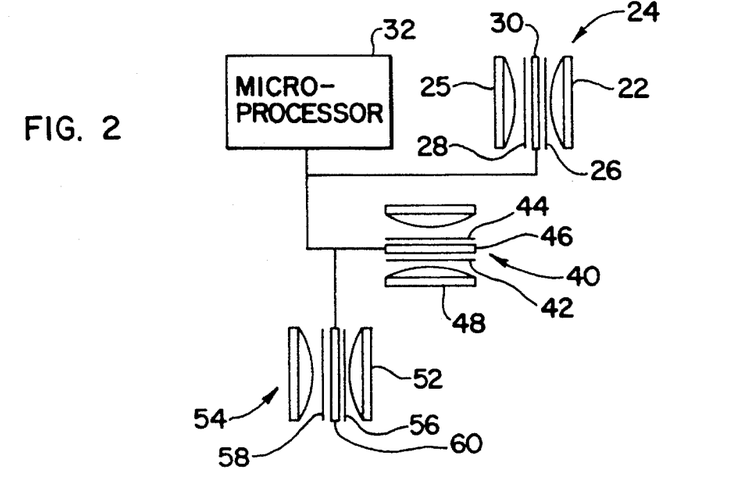
FIG. 2 is a simplified schematic view of certain optical members shown in FIG. 1 and illustrates these members in additional detail and further illustrates how the operation of these members is controlled by signals from a microprocessor.

The light reflected from the dichroic mirror 18 passes to a mirror 20 which reflects the light through a condensing lens 22 to a liquid crystal display panel generally indicated at 24. Liquid crystal display panels such as that indicated at 24 are well known in the art. The light passing through the liquid crystal display panel 24 then passes through a condensing lens 25. As shown in FIG. 2, the liquid crystal display panel 24 may comprise a polarizer 26 and a polarizer 28 on opposite sides of a liquid crystal display member 30. The polarizers 26 and 28 and the display member 30 are preferably disposed in a substantially parallel relationship. The polarizer 26 may be polarized in a particular plane such as the S-plane. The polarizer 28 may be polarized in the other plane such as the P-plane.

The display member 30 is constructed to provide molecules which are substantially aligned in a first plane in its normal operative relationship. This first plane corresponds to the P-plane. When the molecules are disposed in the first plane, light reflected from the mirror 20 in the S-plane passes through the polarizer 26. The light is then rotated by the display member 30 so that the light is in the P-plane. The light is then able to pass through the polarizer 28.

When an electrical signal is applied to the display member 30 from a microprocessor 32, the molecules in the display member are rotated for positioning in a second plane corresponding to the P-plane. This prevents the light passing through the polarizer 26 in the S-plane from passing through the display member 30 and the polarizer 28. This results from the fact that the light in the S-plane from the polarizer 26 is prevented from passing through the display member 30 because the molecules in the display member are in the P-plane.

The blue light passing through the display panel 24 and the condenser lens 25 then passes through a mirror 34 and a mirror 36 to a projection lens 38. Each of the mirrors 34 and 36 is constructed in a well known manner to pass light received on one face of the mirror and to reflect light received on the other face of the mirror. The mirror 34 receives light on its second face from a liquid crystal display panel generally indicated at 40. As shown in FIG. 2, the liquid crystal display panel 40 includes a pair of polarizers 42 and 44 and a liquid crystal display member 46. The liquid crystal display member 46 is constructed in a manner similar to the display member 30 but is constructed to pass only green light. The operation of the display member 46 in passing, or blocking the passage of, the green light through the display panel 40 may be controlled by signals from the microprocessor 32.

The light introduced to the display panel 40 passes to the display panel through a condensing lens 48 from a dichroic mirror or filter 50. The dichroic mirror 50 receives the light passing through the dichroic mirror 18 in the range of wavelengths providing the red and green colors. The dichroic mirror 50 reflects the light in the range of wavelengths providing the green light and passes the light in the range of wavelengths providing the red color. After passing through the display panel 40, the green light is reflected by the mirror 34 and passes through the mirror 36 to the projection lens 38.

The red light passing through the dichroic mirror 50 is introduced to a condensing lens 52 corresponding to the condensing lenses 22 and 48. The green light then passes to a liquid crystal display panel generally indicated at 54. The display panel includes a polarizer 56 (S-band) and a polarizer 58 (P-band) and a liquid crystal display member 60 constructed to pass the green light on a controlled basis. The passage of the green light through the liquid crystal display panel 54 is controlled by signals from the microprocessor 32. The light passing through the display panel 54 are then reflected by a mirror 62 and the mirror 36 to the projection lens 38.

The light passing through the projection lens 38 is adapted to be displayed as an image on a screen (not shown). As will be appreciated, the image displayed at any instant on the screen is dependent upon the modulating signals selectively applied by the microprocessor 32 to individual ones of the display members 30, 46 and 60. As will be appreciated, the modulating signals may be selectively applied on a pixel-by-pixel basis to each of the display members 30, 46 and 60 to provide for the projection by the lens 36 of a television image on the screen.

As disclosed in U.S. Pat. No. 4,864,390, the light paths from the source to the projection lens 38 preferably have equal lengths. Furthermore, the lights paths from the source 12 to the display panels 24, 40 and 54 preferably have equal lengths. By providing these paths with equal lengths, the red, green and blue colors are not distorted from a phase standpoint when they are combined at the projection lens 38. However, such apparatus is disadvantageous because the light paths from the source 12 to the projection lens 38 are relatively long. This prevents the apparatus from being disposed in a compact housing. It further prevents the unit from being easily transported.

The embodiment shown in FIG. 1 provides a compact arrangement in which the distortions in the image at the projection lens 38 are not discernible by human eyes. In this embodiment, certain of the members are rotated through angles preferably less than ten degrees (10°). The angular rotation of these members is preferably about five degrees (5°) to about ten degrees (10°). The rotation of these members significantly increases the compactness of the apparatus. Furthermore, it provides a distortion in the image at the projection lens 38 of three percent (3%) or less. This distortion is generally not visible to the human eye.

In the embodiment of the invention shown in FIG. 1, the members in individual paths such as the blue and red paths are preferably rotated through an angle between approximately 5° and approximately 10° from the positions providing equal path lengths. The members include the dichroic mirror 18, the mirror 20 and the liquid crystal display panel 24 for the path providing the blue light and the liquid crystal display panel 54, the mirror 62 and the mirror 36 for the red path. The rotation of these members is preferably in a clockwise direction from the optimal positions. However, the dichroic mirror 50, the condenser lens 48, the liquid crystal display panel 40 and the mirror 34 for the green light are preferably not rotated.

Figure 3:
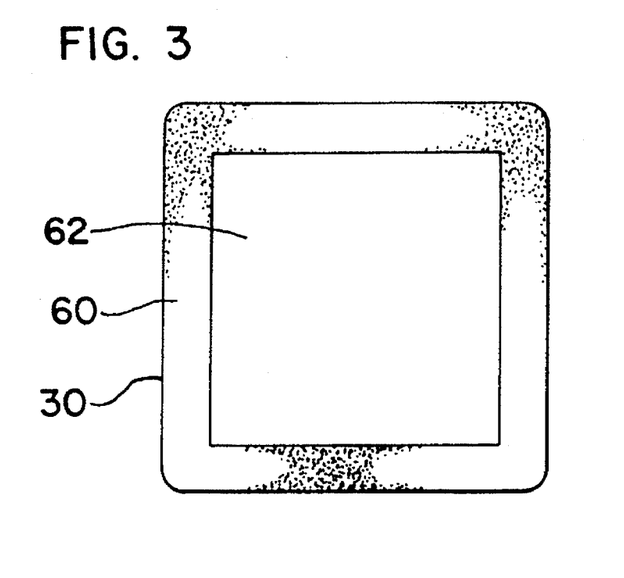
FIG. 3 is schematic view showing additional details in the construction of one of the optical members shown in FIGS. 1 and 2.

As shown in FIG. 3, the display member 30 is rectangular in shape and has a border 60 with a central aperture 62 which is also rectangular in shape and which is preferably symmetrical with the borders. The border 62 is opaque but the central aperture is constructed of a material which passes light. In the case of the member 30, the aperture 62 is constructed to pass blue light. The display members 46 and 60 preferably have a construction corresponding to that shown in FIG. 3 for the member 30 but they have properties respectively to pass green and red light.

Figure 4:
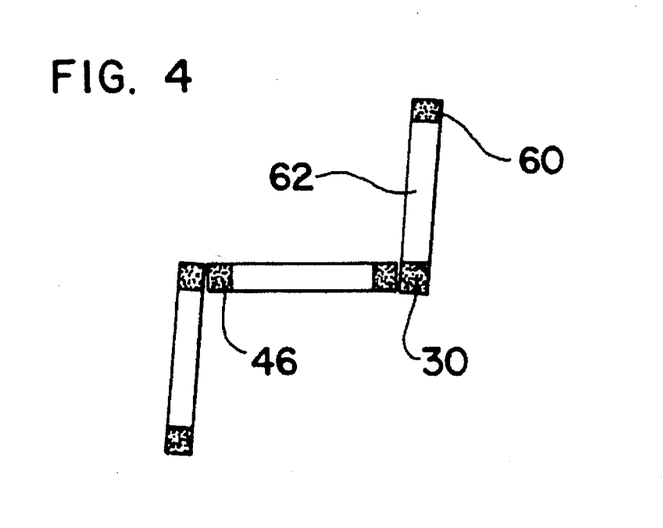
FIG. 4 illustrates on a schematic basis the relative disposition in the system shown in FIG. 1 of a plurality of the optical members each having the construction shown in FIG. 3.

FIG. 4 shows an enlarged schematic arrangement of the display members 30, 46 and 60 in the embodiment shown in FIG. 1. As will be seen, pairs of the display members 30, 46 and 60 abut each other. For example, the display member 46 abuts the display member 30 and also abuts the display member 60. In this abutting arrangement, the border 60 of the display member 30 overlaps the corresponding border of the display member 46. This causes only the aperture 62 of the display member 30 to be above the corresponding aperture of the display member 46. Furthermore, only the aperture of the display member 46 is exposed in the overlapping relationship of the display members 30 and 46. The display member 30 is transverse to the display member 46. As previously described, preferably this angle is between approximately 90° and 100°.

In like manner, the border of the display member 60 overlaps the border of the display member 46. This causes only the aperture of the display member 60 and the aperture of the display member 46 to be displaced from the overlapping relationship between the display members. The display member 60 is transverse to the display member 46. Preferably the angle is between approximately 90° and 100°.

The arrangement of the display members 30, 46 and 60 as shown in FIG. 4 and described above has certain important advantages. One advantage is that the overlapped relationship between the borders of the display member 30 and 46 and between the borders of the display members 46 and 60 enhances the compact arrangement of the members in the different paths. This enhancement is provided without losing any of the intensity of the light in the different paths. This results from the fact that all of the areas of the apertures in the different display members are exposed relative to the abutting display members so that they can receive the full amount of light directed to the apertures.

As previously described, the pre-polarizer 16 polarizes the light in a particular plane. This plane is preferably the S-plane because the polarized light passing in the S-plane through the display members 30, 46 and 60 considerably exceeds the light passing through these display members in the P-plane. This may be seen from a comparison in FIG. 5 between a curve 70 for light in the S-band in a range of wavelength between four hundred (400) and five hundred (500) Angstroms and a curve 72 for light in the P-band for the same range of wavelengths in Angstroms.

Figure 5:
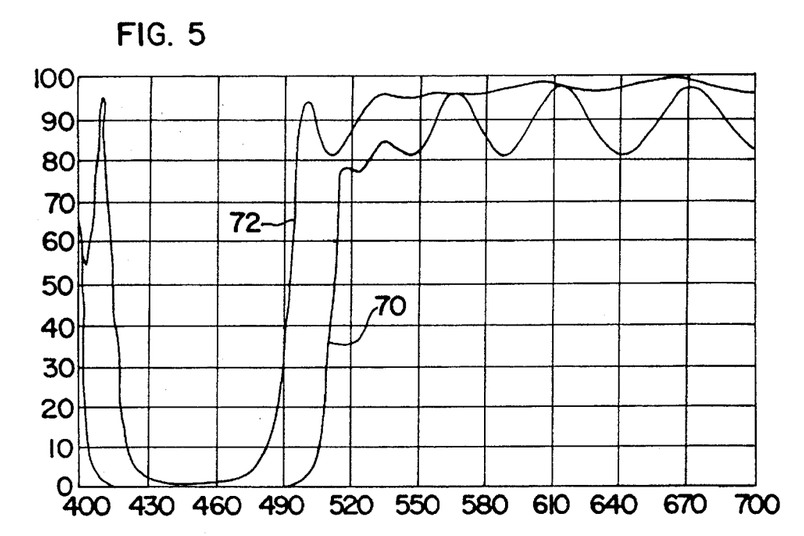
FIG. 5 is a curve illustrating the relative characteristics of the display members shown in the previous FIGS. 1–4 in passing pre-polarized light in the S-plane and the P-plane.

In FIG. 5, the horizontal axis represents different wavelengths of light and the vertical axis represents the amount of light inhibited by one of the display members 30, 46 and 60. As will be seen, the curve 70 indicates that substantially all of the light in the range of wavelengths between approximately four hundred (400) and five hundred (500) Angstroms passes through the display member 60. This is in contrast to the curve 72 which shows that only a portion of the light passes through the display member 60 in the range of wavelengths between approximately four hundred (400) and five hundred (500) Angstroms.

It is well known that the intensity of the light in the band of wavelengths providing the red color is greater than the intensity of the light in the band of wavelengths providing the blue and green colors when the light from the source 12 is separated into the different paths and combined again at the projection lens 38. This provides a distortion in the characteristics of the image projected from the lens 38. This distortion is especially frustrating when corrections are made in other aspects of the image as by providing substantially equal lengths from the paths providing the different colors.

Figure 6:
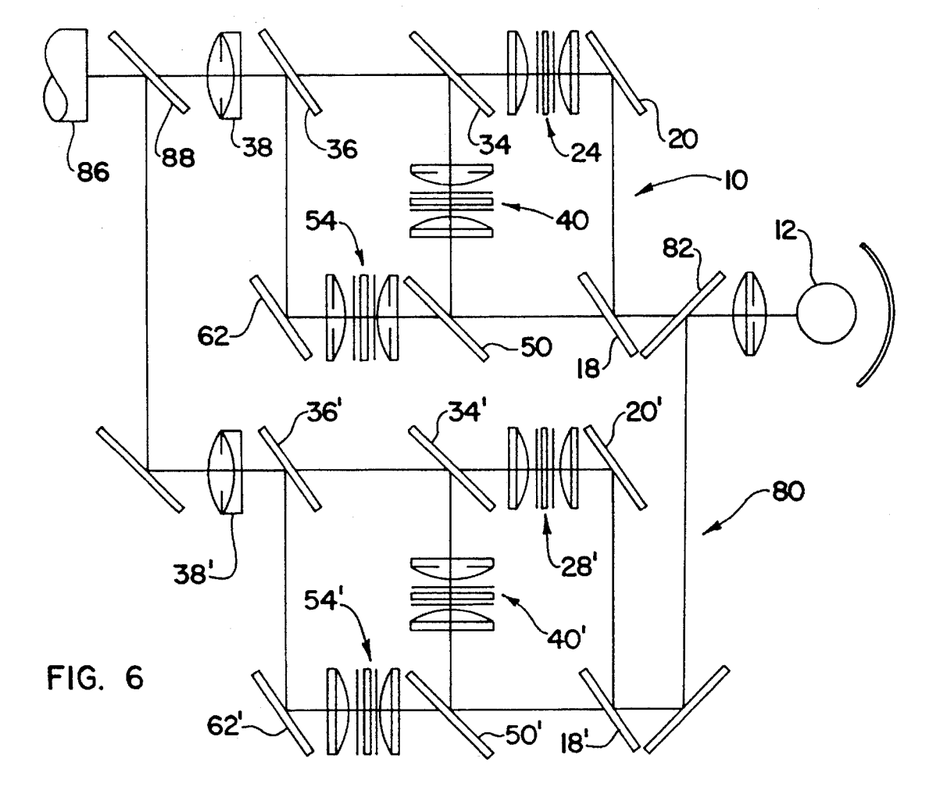
FIG. 6 is a schematic view of another embodiment of optical apparatus constituting this invention.

FIG. 6 schematically illustrates an optical system, generally indicated at 80, for compensating for the greater intensity of the light in a particular range of wavelengths (e.g. red) than in other ranges of wavelength (e.g. blue or green). In the embodiment shown in FIG. 6, a pre-polarizer 82 is disposed and provided with properties to pass a first portion of the polarized light and to reflect a second portion of the polarized light. As in the embodiment shown in FIG. 1, the pre-polarized light is preferably in the S-band. The first portion of the light is then processed in the manner described above and shown in FIG. 1. Because of this, elements corresponding to those shown in FIG. 1 are included in FIG. 6 and are provided with the same designations as in FIG. 1.

The second portion of the pre-polarized light from the pre-polarizer 82 may be introduced to an arrangement corresponding to that shown in FIG. 1. To simplify the discussion and to facilitate understanding, the members responding to the second portion of the light are provided with the same numerical designations as the corresponding members responding to the first portion of the light. However, the members responding to the second portion of the light are provided with a prime (') designation after the numerical designation. For example, the mirror responding to the second portion of the polarized light and corresponding to the mirror 18 responsive to the first portion of the light is designated as 18'.

The operation of the display members 30', 46' and 60' disposed in the paths responsive to the second portion of the light is controlled by signals from the microprocessor 32. These signals may control the operation of the display members 30', 46' and 60' such that light in the particular range of wavelengths with an increased intensity is prevented from being introduced to the projection lens 38. However, light in the range of wavelengths with the reduced intensity is introduced to the projection lens 38 to compensate for the increased intensity of the light in the particular range of wavelengths.

For example, light in the ranges of wavelengths providing the green and blue colors may be introduced to a projection lens 86 to compensate for the increased intensity of the light in the red range of wavelengths. This may be accomplished by passing the light from the projection lens 38' through a mirror 88 to the projection lens 86 and by introducing the light from the projection lens 38 to the mirror 86 for passage through the mirror 88 to the projection lens 86.

The apparatus shown in FIG. 6 may also be used for other purposes in addition to the purpose discussed above. For example, the second portion of the light-in FIG. 6 may be processed to provide information for display in a window on the screen. The processing of the second portion of the light may be related to the processing of the first portion of the light so that the image in the window is related to the image in the remaining portion of the screen. Alternatively, the second portion of the light may be processed independently of the processing of the first portion of the light so that the image in the window is independent of the image in the remaining portion of the screen. As will be appreciated, the images may be formed by modulating the light in the display members 30, 46 and 60 and in the display members 30' 46' and 60' in accordance with information provided by the microprocessor 32.

Figure 7:
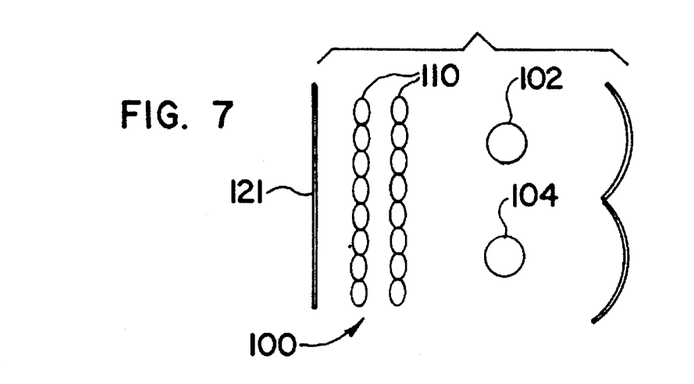
FIG. 7 is a schematic view of a modification to the optical apparatus shown in FIG. 1 to introduce light from a pair of light sources to such apparatus.
Figure 8:
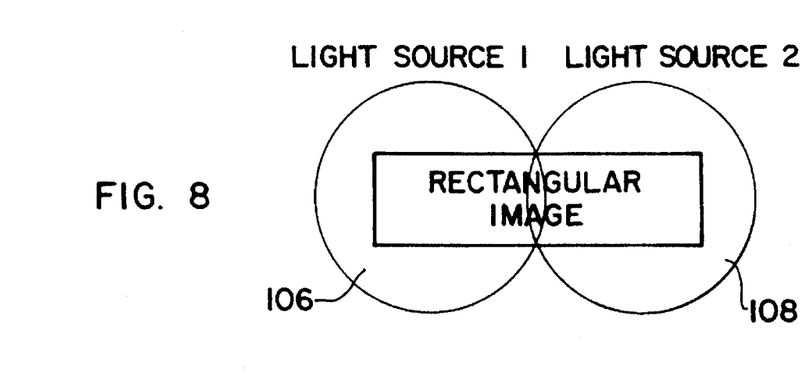
FIG. 8 is a schematic view showing the extended range provided in an image when a pair of light sources are used in the optical apparatus shown in FIG. 1.

A single source 12 is provided in the optical systems shown in FIGS. 1 and 6 and described above. FIG. 7 shows a portion of a system similar to that shown in FIG. 1 and indicated generally at 100. The portion of the optical system shown in FIG. 7 includes a pair of light sources 102 and 104. The light sources 102 and 104 may be disposed to cover individual and overlapping portions of an extended image as respectively indicated at 106 and 108 in FIG. 8. Condensing lenses schematically illustrated at 110 are disposed between the light sources 102 and 104 and a pre-polarizer 112 to integrate and condense the light from the sources 102 and 104. The condensing lens 110 is well known in the art.

Figure 9:
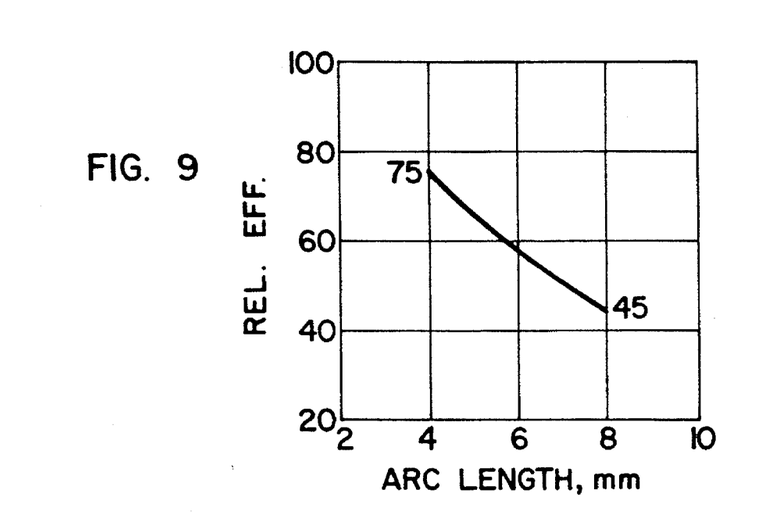
FIG. 9 is a curve illustrating how the relative efficiency of a light source decreases as the length of the arc in the light source is progressively increased.

FIG. 9 indicates a curve of the relative efficiency of a light source such as the light source 12 with progressive values of arc length of the light source. In FIG. 9, the arc length of the light is shown on the horizontal axis in millimeters. The relative efficiency of the light source is shown on the vertical axis. In FIG. 9, the relative efficiency of the light source such as the source 12 decreases from a value of approximately seventy five percent (75%) to a value of approximately forty five percent (45%) as the arc length of the light source increases from a value of approximately four millimeters (4 mm) to approximately eight millimeters (8 mm). As will be appreciated, this is a significant decrease in efficiency. This provides a substantial basis for providing the light sources 102 and 104 when the field of view is somewhat extended. As will be appreciated, more than two (2) light sources may be provided in the system shown in FIG. 2 without departing from the scope of the invention.

Figure 10A:
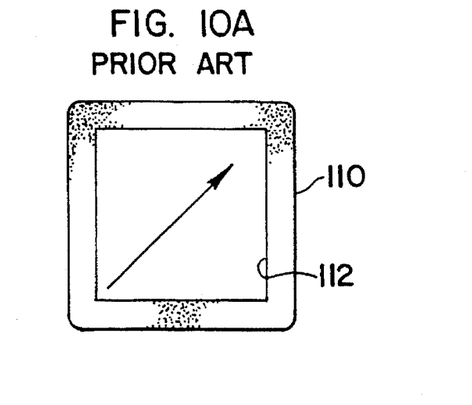
FIGS. 10A and 10B schematically illustrate how liquid crystal display panels included in the embodiments shown in the previous Figures have been constructed in the prior art.
Figure 10B:
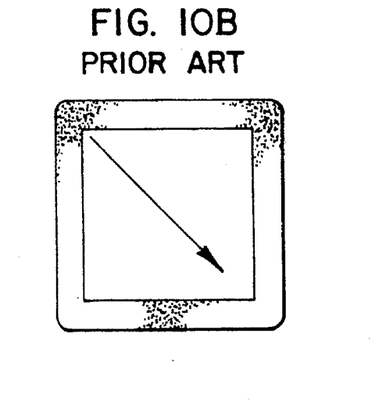

FIGS. 10A and 10B shows how the opposite surfaces of a display member now on the market, such as a display member 110, are rubbed in the display members. As will be seen, a window 112 in the display member 110 is rubbed in diagonal directions relative to the rectangular aperture of the display member. One surface of the window in the display member 110 is rubbed in a diagonal direction from the lower left corner to the upper right corner as indicated schematically at 14 in FIG. 10A. The other surface of the window 112 in the display member 110 is rubbed from the upper left corner to the lower right corner as indicated schematically at 114 in FIG. 10B.

When the window 112 in the display member 112 such as the member 110 in FIGS. 10A and 10B is rubbed in the diagonal directions as discussed in the previous paragraph, not all of the light in all of the wavelengths is able to pass through the window. For example, light in the range of wavelengths providing the blue color is not able to pass through the window 112 in the display member 110. This causes the light passing through the window 112 to have a yellow color. As will be appreciated, this represents a distortion in the image.

Figure 11A:
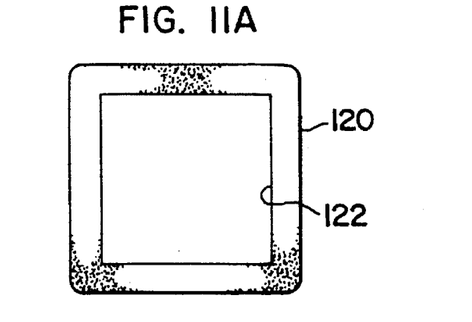
FIGS. 11A and 11B schematically illustrate how one embodiment of a liquid crystal display panel may be constructed to enhance the operation of this invention.
Figure 11B:
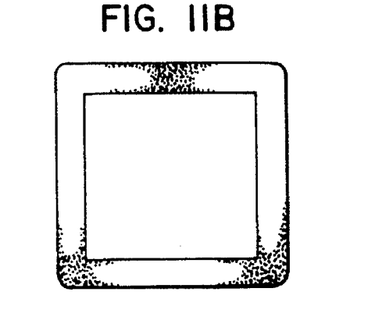

This invention provides display members which overcome the disadvantages discussed above. For example, FIGS. 11A and 11B schematically illustrate a display member 120 in which the opposite surfaces of a window 122 in the display member are not rubbed. This is indicated schematically in FIG. 10 by a clear showing of the window 122 in the display member. By providing the opposite surfaces of the window 122 in an unrubbed state, substantially all of the light in all of the wavelengths is able to pass through the aperture. This causes the light passing through the apertured surface to have a white, rather than a yellow, color.

Figure 12A:
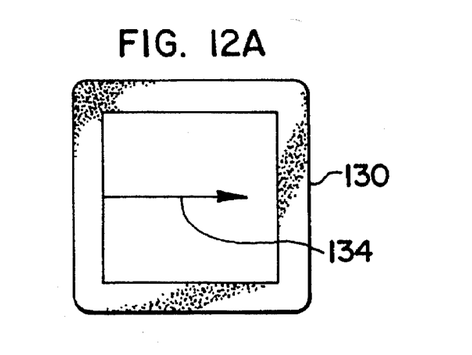
FIGS. 12A and 12B schematically illustrate how another embodiment of a liquid crystal display panel may be constructed to enhance the operation of this invention.
Figure 12B:
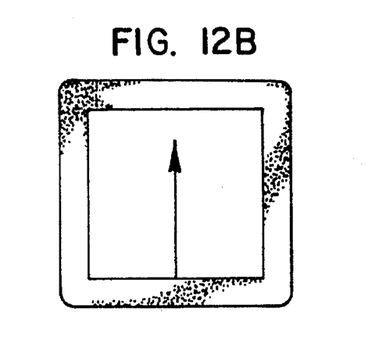

FIGS. 12A and 12B show a display member 130 which also passes all of the light in all of the wavelengths to provide a white color. In FIGS. 12A and 12B, a window 132 in the display member 130 has a rectangular configuration. One surface of the window 132 is rubbed in a direction substantially parallel to one peripheral edge of the window as indicated at 134 in FIG. 12A and the other surface of the window is rubbed in a direction substantially parallel to the other periphery of the window as indicated at 136 in FIG. 12B.

The display members shown in FIGS. 11A and 11B and FIGS. 12A and 12B and described above are advantageous for use in the systems of this invention, and particularly the systems shown in FIGS. 1, 6 and 7. By providing in such systems the display members shown in FIGS. 11A and 11B and FIGS. 12A and 12B, the output light projected by such lenses as the lens 36 in FIG. 1 is provided with a greater fidelity of color than in the prior art.

Figure 13:
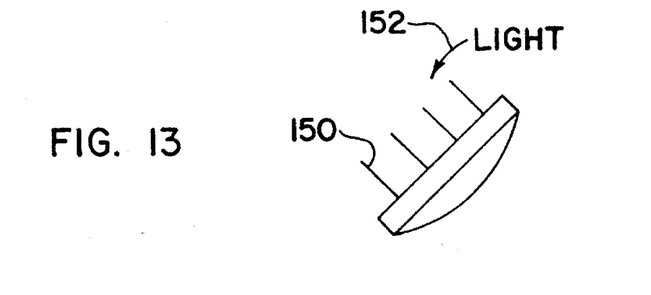
FIG. 13 schematically illustrates the direction in which light may be provided to a liquid crystal display panel to enhance an image.

FIG. 13 shows another modification of the invention. In FIG. 13, the molecules on the surfaces of the aperture 62 in the liquid crystal display member 30 are shown schematically at 150 as having an orientation in a particular direction. Under such circumstances, the light is passed to the surface of the aperture 62 in a direction substantially perpendicular to the orientation 150. This is indicated schematically at 152 in FIG. 7. This tends to enhance the intensity of the image on the screen.

Figure 14:
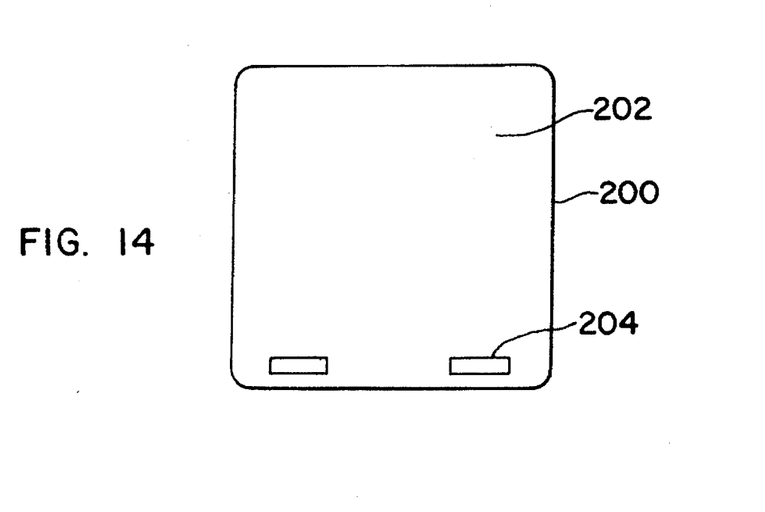
FIG. 14 schematically illustrates another type of an optical member which may be used in the embodiments shown in the previous Figures.
Figure 15:
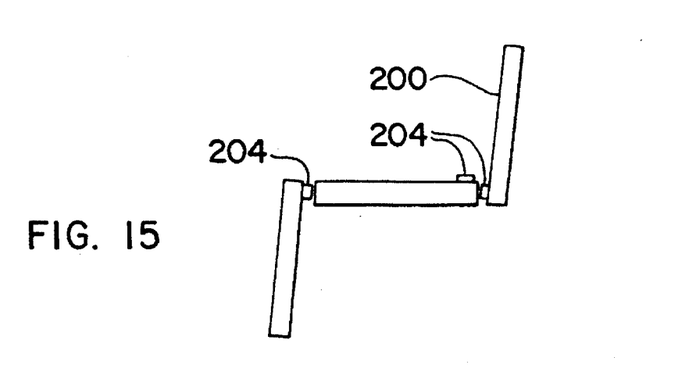
FIG. 15 illustrates on a schematic basis the relative disposition in the system shown in FIG. 1 of a plurality of optical members each having the construction shown in FIG. 14.

FIGS. 14 and 15 illustrate another embodiment of the invention. In this embodiment, the different liquid displays 200 are not provided with a border such as shown in FIG. 3. As a result, each liquid crystal display has an aperture 202 (FIG. 14) which comprises the full area of the display. Furthermore, semiconductor chips 204 for controlling the operation of the display are disposed within the aperture 202 at the periphery of the aperture.

A plurality of liquid crystal displays 200 may be disposed in an array as shown in FIG. 15. As shown, three (3) liquid display displays are disposed in the array shown in FIG. 15. Each of the liquid crystal displays may be responsive to an individual one of the primary colors red, green and blue.

As will be seen in FIG. 15, the displays are disposed so that the semiconductor chips 204 are disposed in overlapping relationship. In this sense, the embodiment shown in FIG. 15 is similar to the embodiment shown in FIG. 4 in that only the operative portions of the apertures 202 in the displays 200 are exposed. However, the embodiment shown in FIG. 15 is advantageous over the embodiment shown in FIG. 4 in that the semiconductor chips 204 are disposed on the liquid crystal display but are covered in the overlapping relationship of the displays.

In the embodiments described above, the S and P polarizing directions in the dichroic mirrors such as in the mirror 18 in FIG. 1 are aligned with these directions in the pre-polarizer such as the polarizer 16 in FIG. 1. Furthermore, the S and P polarizing directions in the liquid crystal displays such as in the liquid crystal displays 24 are aligned with the S and P polarizing directions in the dichroic mirrors such as in the dichroic mirror 18. By providing this arrangement, sharp contrasts are provided in the liquid crystal displays between the different colors and a unit with optimal optical characteristics is provided.

The apparatus described above and shown in the drawings has certain important advantages. The apparatus is compact and yet is able to provide images in distinctive color patterns on screen without any significant distortion in the phases of the light passing in the different colors to the screen. The apparatus provides light images with increased intensity on the screen. Furthermore, if there is any tendency for the light of individual colors to have a greater intensity on the screen than light of other colors, the apparatus of this invention is able to compensate for these different intensities so as to produce an image on a screen with colors at the different pixel positions on the screen corresponding to the color intensities of the actual presentation from which the image is obtained.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

I claim:

1. In combination for providing an image for projection, first means for providing white light, second means for pre-polarizing the white light in a particular plane, third means responsive to the light of the particular plane for dividing the light into separate components each having a wavelength providing an individual color and cumulatively with the other components providing the white light, fourth means responsive to each individual wavelength component for selectively modulating such component, and fifth means responsive to the selectively modulated light components from the fourth means for combining such components, the fourth means including a plurality of liquid crystal display panels each associated with an individual one of the light components, each of the liquid crystal display panels having an aperture and a border around the aperture, the liquid crystal display panels in the plurality being disposed in pairs with one of the liquid crystal display panels in each pair being disposed in transverse relationship to the other liquid crystal display panel in the pair, the liquid crystal display panels in each pair having overlapping relationships.

2. In a combination as set forth in claim 1, the second means pre-polarizing the light in the S-plane.

3. In a combination as set forth in claim 2, the liquid crystal display panels in each pair having a transverse relationship different from 90° relative to the other liquid crystal display panel in the pair.

4. In a combination as set forth in claim 1, the third means including a plurality of mirrors and a plurality of dichroic members, each individual one of the mirrors and the dichroic members being associated with an individual one of the liquid crystal display panels to provide an individual one of the components of the white light.

5. In combination for providing an image for projection, first means for providing a pair of spaced lights, condenser lens means for integrating the pair of spaced lights, second means for pre-polarizing the integrated lights from the condenser lens means, third means for separating the integrated lights from the second means into a plurality of paths each providing an individual wavelength component of the integrated lights, the individual wavelength components collectively providing the light, fourth means for selectively modulating the individual wavelength components of the light, and fifth means for combining the wavelength components after the selective modulation of the wavelength components.

6. In a combination as set forth in claim 5 wherein the second means pre-polarizes the integrated lights into an S-plane.

7. In a combination as set forth in claim 5 wherein the second means passes a first particular portion of the integrated lights and pre-polarizes the first particular portion of the integrated lights and wherein the third, fourth and fifth means operate upon the first portion of the integrated lights and wherein the second means reflects a second particular portion of the integrated lights and wherein sixth means processes the second particular portion of the integrated lights independently of the operation of the third, fourth and fifth means.

8. In a combination as set forth in claim 5, wherein, the third means includes a plurality of mirrors, a plurality of dichroic means and a plurality of liquid crystal display means and wherein the mirrors, the dichroic means and the liquid display means are arranged in a particular disposition to provide equal distances between the first and fifth means for the individual wavelength components in the different paths, and wherein individual ones of the mirrors, the dichroic means and the liquid crystal display means are rotated through particular angles from the particular dispositions to facilitate an increased compact disposition of the mirrors, the dichroic means and the liquid crystal display means without substantially affecting the quality of the image provided by the fifth means in accordance with the selective modulations of the individual wave length components in the different paths.

9. In a combination as set forth in claim 8 wherein the second means pre-polarizes the integrated lights into the S-plane.

10. In a combination as set forth in claim 9 wherein the liquid display means in the plurality are non-rubbed.

11. In a combination as set forth in claim 9 wherein the liquid crystal display means in the plurality have apertures surrounded by borders and wherein the surfaces of the liquid crystal display means are rubbed in directions corresponding to the directions of the borders.

12. In a combination as set forth in claim 8, the liquid crystal display means in the plurality have apertures and have, within the apertures, means for controlling the display in the apertures and wherein the apertures in the plurality are disposed in a paired relationship and wherein the apertures in each pair are disposed with their controlling means in overlapping relationship.

13. In combination for providing an image for projection, first means for providing light, second means for pre-polarizing the light in a particular plane and for separating the light into first and second energy portions, third means for dividing the first energy portion of the pre-polarized light into a plurality of different paths each providing a component of the first energy portion of the light in an individual range of wavelengths, fourth means for operating on the components of the first energy portion of the light in the different paths to selectively modulate such components of the first energy portion of the light in individual ones of the different paths, fifth means for combining the modulated components of the first energy portion of the light, sixth means for processing the second energy portion of the pre-polarized light independently of the operation of the third, fourth and fifth means.

14. In a combination as set forth in claim 13 seventh means for combining the light from the fifth and sixth means.

15. In a combination as set forth in claim 13, the third and fourth means having characteristics to provide the light components in particular ranges of wavelengths with reduced intensities relative to the light components in other ranges of wavelengths, the sixth means being operative to process the second portion of the pre-polarized light in such particular ranges of wavelengths to compensate for the reduced intensities of the light components in the such ranges of wavelengths in the light combined by the fifth means, and seventh means for combining the light from the fifth and sixth means.

16. In a combination as set forth in claim 13, the sixth means including seventh means for dividing the second energy portion of the pre-polarized light into a second plurality of different paths each providing a component of the second energy portion of the light in an individual range of wavelength, the sixth means including eighth means for operating on the second energy portions of the light in the second plurality of different paths to selectively modulate the second energy portion of the light in individual ones of the different paths in the second plurality.

17. In a combination as set forth in claim 13, seventh means for condensing and projecting the light from the fifth and sixth means.

18. In a combination as set forth in claim 17, eighth means for projecting the light from the fifth means, and ninth means for projecting the light from the seventh means.

19. In combination for providing an image for projection, first means for providing light, second means for pre-polarizing the light in an S-plane and for dividing the light into first and second energy portions, third means for separating the first energy portion of the pre-polarized light in the S-plane into a plurality of paths each providing light in an individual range of wavelengths which cumulatively provide the light, each of the paths including an individual one of a plurality of mirrors, an individual one of a plurality of dichroic members and an individual one of a plurality of liquid crystal display panels, fourth means for selectively operating upon individual ones of the liquid crystal display panels to modulate the light in the paths including such individual ones of the liquid crystal display panels, fifth means for combining the light in the different paths after the modulation of the light in the paths including the individual ones of the liquid crystal display panels, and sixth means for processing the second energy portion of the pre-polarized light in the S-band independently of the operation of the third and fourth means.

20. In a combination as set forth in claim 19, the mirrors, the dichroic members and the liquid crystal display panels having particular dispositions relative to one another to provide equal distances between the first and fifth means in the different paths and the mirrors, dichroic members and the liquid crystal display panels in individual ones of the paths being changed from such particular dispositions to enhance the compactness of the disposition of the mirrors, the dichroic members and the liquid display members without materially affecting the quality of the image provided by the fifth means.

21. In a combination as set forth in claim 20, the mirrors, the dichroic members and the liquid crystal display members in the paths including the individual ones of the liquid crystal display panels being rotated through angles of less than approximately 10° from the particular dispositions of such members, the mirrors, the dichroic members and the liquid crystal display members in at least one of the paths other than the paths including the individual ones of the liquid crystal display members having the particular dispositions.

22. In a combination as set forth in claim 19, the sixth means including seventh means for separating the second energy portions of the pre-polarized light into a second plurality of paths each providing light in an individual range of wavelengths which cumulatively provide the light in the second energy portion, each of the paths in the second plurality including an individual one of a second plurality or dichroic mirrors and an individual one of a second plurality of liquid crystal display panels, the sixth means including eighth means for selectively operating upon individual ones of the liquid crystal members in the second plurality to modulate the light in the paths including such individual ones of the liquid crystal display members in the second plurality.

23. In a combination as set forth in claim 19, there being greater attenuations of the first energy portion of the light in particular ones of the different paths than in other ones of the different paths, the sixth means being operative on the second energy portion to compensate for the different attenuations of the first energy portion of the light in the particular paths in the other ones of the different paths, and means for combining and projecting the second energy portions from the sixth means and the first energy portions from the fifth means.

24. In a combination as set forth in claim 19, each of the liquid crystal display members in the plurality having an aperture and a border around the aperture, the liquid crystal display members in the plurality being disposed in abutting and transverse relationship to one another with the borders on the abutting liquid crystal display members overlapping each other.

25. In a combination as set forth in claim 19, each of the liquid crystal display members in the plurality having an aperture and a border around the aperture, the adjacent liquid crystal display members in the plurality being disposed in a transverse relationship at an angle different from 90° relative to each other with an overlapping between the borders on such liquid crystal display members.

26. In a combination as set forth in claim 25, each of the liquid crystal display members in the plurality having an aperture and having, within the perimeter of the aperture, means for controlling the display from the aperture, the adjacent liquid crystal display members in the plurality being disposed in a transverse relationship with an overlapping relationship between the controlling means in different ones of the liquid crystal display members.

27. In combination for providing an image for projection, first means for providing light, second means for pre-polarizing the light in a particular plane, third means for dividing the pre-polarized light into a plurality of paths each providing an individual range of wavelengths, each of the paths including an individual one of a plurality of liquid crystal display panels, each of the liquid crystal display panels having a pair of opposite surfaces each of which is non-rubbed to pass substantially all of the light in a particular range of wavelengths in a first state of operation of such liquid crystal display panel and to block any passage of light in a second state of operation of such liquid crystal display panel, means for selectively producing the first and second states of operation in each individual one of the liquid crystal display panels, and means for combining the light passing through the individual ones of the liquid crystal display panels after the selective production of the first and second states of operation in such individual ones of the liquid crystal display panels.

28. In a combination as set forth in claim 27, a plurality of first polarizers each constructed to pass polarized light with a P-plane, a plurality of second polarizers each constructed to pass polarized light with an S-plane, a plurality of liquid crystal display members, an individual one of the first polarizers and an individual one of the second polarizers being disposed on opposite sides of an individual one of the liquid crystal display members to define an individual one of the liquid crystal display panels.

29. In a combination as set forth in claim 28, condenser lens means associated with each individual one of the liquid crystal display panels.

30. In a combination as set forth in claim 27, the second means pre-polarizing the light in the S-plane, each of the paths including an individual one of a plurality of mirrors and an individual one of a plurality of dichroic members.

31. In a combination as set forth in claim 28, each of the paths including an individual one of a plurality of mirrors and an individual one of a plurality of dichroic members, the individual ones of the mirrors, the individual one of the dichroic members and the individual one of the liquid crystal display members in particular ones of the paths being angularly displaced from positions providing an equal distance in such path relative to the other paths between the first means and the fifth means.

32. In a combination as set forth in claim 31, wherein individual ones of the first polarizers and individual ones of the second polarizers being associated with individual ones of the liquid crystal display members, the second means pre-polarizing the light in the S-plane, the angular displacement of the individual ones of mirrors, the individual ones of the dichroic members and the individual ones of the liquid crystal display members in the particular paths constituting rotations of less than 10° from the positions providing an equal distance in such paths.

33. In combination for providing an image for projection, first means for providing light, second means for pre-polarizing the light in a particular plane, third means for dividing the pre-polarized light into a plurality of different paths each providing the pre-polarized light in an individual range of wavelengths, each of the paths including an individual one of a plurality of planar liquid crystal display members, each of the liquid crystal display members including pixels rotatable in its plane between a first disposition and a second disposition, each of the liquid crystal display members being rubbed in directions corresponding to the first and second dispositions of such liquid crystal display member, a plurality of fourth means each having a plurality of pixels and each associated with an individual one of the liquid crystal display members for operating in conjunction with the individual one of the liquid crystal display members to pass the light in the associated path in the first dispositions of the individual ones of the pixels in the liquid crystal display members and to prevent the passage of the light in the associated path in the second dispositions of the individual ones of the pixels in the liquid crystal display members, fifth means for selectively rotating individual ones of the pixels in the liquid crystal display members between the first and second dispositions, and sixth means for combining the light in the different paths after the selective rotation of the light in individual ones of the pixels in the liquid crystal display members between the first and second dispositions.

34. In a combination as set forth in claim 33, the plurality of fourth means including a plurality of first polarizers operative to polarized light in the P plane and a plurality of second polarizers operative to pass polarized light in the S plane, each of the first polarizers and each of the second polarizers being disposed on opposite sides of an individual one of the liquid crystal display members.

35. In a combination as set forth in claim 34, each of the liquid crystal display members having first and second opposite surfaces having rectangular configurations and being rubbed on the first surface in a first direction defining one coordinate axis of the rectangular configuration and being rubbed on the second surface in a second direction defining another coordinate axis of the rectangular configuration.

36. In a combination as set forth in claim 35, the second means pre-polarizing the light in the S-plane, each of the paths including an individual one of a plurality of mirrors and an individual one of a plurality of dichroic members, the individual ones of the mirrors, the individual ones of the dichroic members and the individual ones of the liquid crystal display members for particular ones of the paths being rotated in directions transverse to the planes of such mirrors, such dichroic members and such liquid crystal display members from positions providing for equal distances in the associated paths between the first means and the sixth means and between the liquid crystal display members and the sixth means.

37. In a combination as set forth in claim 36, the individual one of the mirrors, the individual one of the dichroic members and the individual one of the liquid crystal display members for a path other than the particular paths being in the positions providing for equal distances in the different paths between the first means and the sixth means and between the liquid crystal display members and the sixth means.

38. In combination for providing an image for projection, first means for providing light, second means for pre-polarizing the light, third means for dividing the light into a plurality of individual ranges of wavelengths, a plurality of fourth means each operative upon the light in an individual one of the ranges of wavelengths in the plurality for selectively passing such light, the plurality of fourth means including a plurality of liquid crystal display members, a plurality of first polarizers each operative to pass light in the P-plane and disposed on one side of an associated one of the liquid crystal display members and a plurality of second polarizers each operative to pass light in the S-plane and disposed on the other side of an associated one of the liquid crystal display members, each of the liquid crystal display members having opposite surfaces each with boundaries defining coordinate directions, one of the surfaces in each of the liquid crystal display members being rubbed in one of the co-ordinate directions and the other of the surfaces in each liquid crystal display member being rubbed in the other co-ordinate direction, each of the liquid crystal display members having pixels rotatable between first and second positions on an axis perpendicular to the planar configuration to provide for a passage of light in the first position and to prevent the passage of light in the second position, fifth means for modulating the pixels in each liquid crystal display member to rotate the light in individual ones of the pixels between the first position and the second position, and sixth means for combining the light from the plurality of fourth means after the selective passage of the pre-polarized light in the different ranges of wavelength by the third means and the modulation of the light in the individual ones of the pixels in the liquid crystal display members.

39. In a combination as set forth in claim 38, the third means including a plurality of mirrors and a plurality of dichroic mirrors, each of the mirrors and each of the dichroic mirrors being associated with an individual one of the liquid crystal display members in an individual one of the paths.

40. In a combination as set forth in claim 39, the individual ones of the mirrors, dichroic members, liquid crystal display members and first and second polarizers for particular ranges of wavelengths being angularly rotated from the planar positions defining equal lengths for the movement of the light in such wavelengths ranges between the first means and the fourth means and between the fourth means and the sixth means, the mirror, the dichroic member, the liquid crystal display member, the first polarizer and the second polarizer for at least one of the ranges of wavelengths other than the particular ranges being angularly disposed in the positions defining the equal length for the movement of the light in such range of wavelengths between the first means and the fourth means and between the fourth means and the sixth means.

41. In a combination as set forth in claim 40, the first means consisting of two sources of light each for illuminating a different area than the other source, and seventh means disposed between the first means and the second means for condensing the light from the two sources.

42. In combination for providing an image for projection, first means for providing light, second means for pre-polarizing the light in a particular plane, third means for separating the pre-polarized light into a plurality of ranges of wavelengths, the third means including a plurality of liquid crystal display members each constructed and disposed to pass the light in an individual one of the ranges of wavelengths, each of the liquid crystal display members having first and second opposite surfaces, each of the opposite surfaces of each of the liquid crystal display members being rubbed in a particular direction to dispose molecules on such surface in a direction dependent upon the direction in which such surface is rubbed, each of the liquid crystal display members being disposed to receive the light in an individual one of the ranges of wavelengths in a direction substantially perpendicular to the direction in which the molecules on the surface receiving such light are disposed, fourth means for selectively operating upon individual ones of the liquid crystal display members to control the passage through such liquid crystal display members of light in the range of wavelengths incident upon such liquid crystal display members, and fifth means for combining the light from the liquid crystal display members after the selective operation of the fourth means upon the individual ones of the liquid crystal display members.

43. In a combination as set forth in claim 42, the first means providing a plurality of individual lights, and means disposed between the first means and the second means for condensing and integrating the plurality of lights.

44. In a combination as set forth in claim 42, the second means being operative to pre-polarize the light in the S-plane.

45. In a combination as set forth in claim 42, the angles of disposition of particular ones of the liquid crystal display members operative upon particular ranges of the wavelengths being rotated from the angles providing equal distances between the first means and the different liquid crystal display members in the plurality and between such liquid crystal display members and the fifth means.

46. In combination, first, second and third liquid crystal display means, each of the first, second and third liquid crystal display means being constructed to pass light in an individual range of wave lengths, the second liquid crystal means being disposed at opposite ends in abutting relationship to the first and third liquid crystal display means at transverse angles different from 90°.

47. In a combination as set forth in claim 46, each of the liquid crystal display means having an aperture and a border around the aperture, the second liquid crystal display means being disposed with its border overlapping the borders on the first and third liquid crystal display means.

48. In a combination as set forth in claim 47, each of the liquid crystal display members including:

a liquid crystal display member, a first polarizer disposed on one side of the liquid crystal display member and polarized in an S-plane, and a second polarizer disposed on the other side of the liquid crystal display member and polarized in a P-plane.

49. In a combination as set forth in claim 46, each of the liquid crystal display members having an aperture defined by a perimeter and having, near the perimeter, means for controlling the display in the aperture, the second liquid crystal display means being disposed to overlap the controlling means in the first and third liquid crystal display means.

50. In a combination as set forth in claim 49, each of the liquid crystal display members including:

a liquid crystal display member, a first polarizer disposed on one side of the liquid crystal display member and polarized in an S-plane, and a second polarizer disposed on the other side of the liquid crystal display member and polarized in a P-plane.

51. In a combination for providing an image for projection, first means for providing light, second means for pre-polarizing the light in an S-plane, third means for dividing the pre-polarized light into components individually representing different wavelengths of the light and cumulatively representing the light, fourth means for selectively modulating the individual components of the light, fifth means for recombining the selectively modulated individual components of the light to provide the image for projection, and wherein the fourth means including a plurality of liquid crystal display panels each for an individual component of the light, each of the liquid crystal display panels having an aperture for passing the light and a border around the aperture, the displays being disposed with the apertures in a substantially abutting relationship.

52. In a combination as set forth in claim 51, the third means being constructed and disposed to provide the light paths with substantially equal lengths from the first means to the fourth means.

53. In a combination as set forth in claim 51, the third means being constructed and disposed to provide light paths with substantially equal lengths from the fourth means to the fifth means.

54. In a combination for providing an image for projection, first means for providing light, second means for pre-polarizing the light in an S-plane, third means for dividing the pre-polarized light into components individually representing different wavelengths of the light and cumulatively representing the light, fourth means for selectively modulating the individual components of the light, fifth means for recombining the selectively modulated individual components of the light to provide the image for projection, the third means being constructed and disposed to provide the light paths with substantially equal lengths from the first means to the fourth means, the third means including a plurality of liquid crystal display panels each for an individual component of light, each of the display panels having an aperture for passing the light and a border around the aperture, the display panels being disposed in an overlapping relationship such that the boundaries between the apertures and the borders of pairs of the liquid crystal displays abut each other.

55. In a combination as set forth in claim 54, the liquid crystal display panels in the pairs being disposed in transverse relationships defining angles different than 90° to provide for a compact relationship of the combination.

56. In a combination as set forth in claim 55, the third means being constructed and disposed to provide substantially equal lengths for the light paths between the first means and the fourth means, the third means being additionally constructed and disposed to provide substantially equal lengths for the light paths between the third means and the fifth means.

57. In a combination for providing an image for projection, first means for providing light, pre-polarizer means responsive to the light for passing the light in an S-polarized plane, second means including a plurality of mirrors, a plurality of dichroic members and a plurality of liquid crystal display panels disposed relative to one another to direct individual components of the light into different paths all of substantially equal lengths, individual ones of the mirrors, the dichroic members and the liquid crystal display panels being rotated from the planar positions defining for such mirror, dichroic members and liquid crystal display panels the paths of equal lengths for the different components of the light, thereby to enhance in the second means a compact relationship of the mirrors, the dichroic members and the liquid crystal display panels in the plurality, third means for modulating in individual ones of the liquid crystal display panels the components of the light passing through such individual ones of such liquid crystal display panels, fourth means for recombining the components of the light modulated by the liquid crystal display panels in the plurality, each of the different paths including an individual one of the mirrors in the plurality, an individual one of the dichroic members in the plurality and an individual one of the liquid crystal display panels in the plurality, and each of the liquid crystal display panels having an aperture and a border around the aperture, the liquid crystal display panels in the plurality being disposed in a relationship in which pairs of liquid crystal display panels have a transverse relationship to each other and overlap each other by a distance corresponding substantially to the dimensions of the borders in such liquid crystal display panels.

58. In a combination as set forth in claim 57, the rotation of the mirrors, the dichroic members and liquid display panels from the planar positions defining the equal lengths for such paths being less than approximately 10°.

59. In a combination for providing an image for projection, first means for providing light, pre-polarizer means responsive to the light for passing the light in an S-polarized plane, second means including a plurality of mirrors, a plurality of dichroic members and a plurality of liquid crystal display panels disposed relative to one another to direct individual components of the light into different paths all of substantially equal lengths, individual ones of the mirrors, the dichroic members and the liquid crystal display panels being rotated from the planar positions defining for such mirrors, dichroic members and liquid crystal display panels the paths of equal lengths for the different components of the light, thereby to enhance in the second means a compact relationship of the mirrors, the dichroic members and the liquid crystal display panels in the plurality, third means for modulating in individual ones of the liquid crystal display panels the components of the light passing through such individual ones of such liquid crystal display panels, fourth means for recombining the components of the light modulated by the liquid crystal display panels in the plurality, each of the different paths including an individual one of the mirrors in the plurality, an individual one of the dichroic members in the plurality and an individual one of the liquid crystal display panels in the plurality, and each of the liquid crystal display panels having an aperture and having means disposed at the periphery of the aperture for controlling the operation of such liquid crystal display panel, the liquid crystal display panels in the plurality being disposed in a relationship in which pairs of liquid crystal display panels have a transverse relationship to each other and overlap each other by a distance to cover the controlling means at the peripheries of the displays.

60. In a combination for providing an image for projection, according to claim 59, wherein said the mirrors, the dichroic members and liquid crystal display panels for individual ones of the paths being rotated from the planar positions defining the equal lengths for such paths and the mirror, the dichroic member and the liquid crystal device from at least one other of the paths being disposed at the planar positions defining the equal length for such path.

61. In a combination as set forth in claim 59, the third means and the fourth means being disposed to provide substantially equal distances for the light paths between the first means and the fifth means.

62. In a combination as set forth in claim 59, the fourth means including liquid crystal display panels rotated from angular positions providing the substantially equal lengths between the first means and the fifth means for the different paths.

63. In a combination for providing an image for projection, according to claim 59, wherein each of the paths including an individual one of a plurality of mirrors and an individual one of a plurality of dichroic members, and wherein the mirrors, the dichroic members and the liquid crystal display panels having particular dispositions relative to one another to provide equal distances between the first and four means in the different paths and individual one of the mirrors, the dichroic members and the liquid display panels being changed from such particular dispositions to enhance the compactness of the combination without materially affecting the quality of the image provided by the fourth means.

64. In a combination for providing an image for projection according to claim 59, wherein said mirrors and plurality of dichroic members divide the light into a plurality of different paths in accordance with the color characteristics of the light, and wherein said mirrors and dichroic members rotated from positions providing paths of substantially equal lengths between the first means and the fourth means to make the combination compact without providing any visual deterioration of the image.

65. In a combination for providing an image for projection, first means for providing light, second means for pre-polarizing the light in a particular plane, third means for providing for the pre-polarized light a plurality of paths each receiving the pre-polarized light in a particular range of wavelengths, each of the paths including an individual one of a plurality of mirrors and an individual one of a plurality of dichroic means, a plurality of fourth means each including a liquid display panel for selectively modulating the range of wavelength components in individual ones of the different paths, and fifth means for combining the pre-polarized light in the different paths after the selective modulation of the ranges of wavelengths in such paths by the individual ones of the liquid crystal display panels in such paths, the mirrors, the dichroic means and the liquid crystal display panels having particular dispositions relative to one another to provide equal distances between the first and fifth means in the different paths and individual one of the mirrors, the dichroic means and the liquid display means being changed from such particular dispositions to enhance the compactness of the combination without materially affecting the quality of the image provided by the fifth means in accordance with the selective modulations of the individual wave length components in the different paths, the pre-polarizer means being operative to split the pre-polarized light into two parts, the third, fourth and fifth means being operative on one part of the light, and means for processing the other part of the light independently of the operation of the third, fourth and fifth means.

66. In a combination as set forth in claim 65, the individual ones of the mirrors, dichroic means and liquid crystal display panels for only particular ones of the different paths being rotated through particular angles to enhance the compactness of the combination without substantially affecting the quality of the image provided by the fifth means.

67. In a combination as recited in claim 65, the mirrors, the dichroic means and the liquid crystal display panel for at least one of the different paths being disposed in the positions where they would be providing equal distances with the mirrors, the dichroic means and the liquid crystal display panels in the other paths if the mirrors, the dichroic means and the liquid crystal display panels in such other paths were not rotated.

68. In a combination as set forth in claim 65, the second means being operative to pre-polarize the light in an S-plane, the angle of rotation of the individual ones of the mirrors, the dichroic means and the liquid crystal display panels for the particular ones of the different paths being less than approximately 10°.

69. In a combination as set forth in claim 65, means for projecting the light from the fifth means for display on a viewing surface.

* * * * *